H. J. YEARGIN.
Combined Land Roller and Harrow.
No. 163,562.  Patented May 18, 1875.
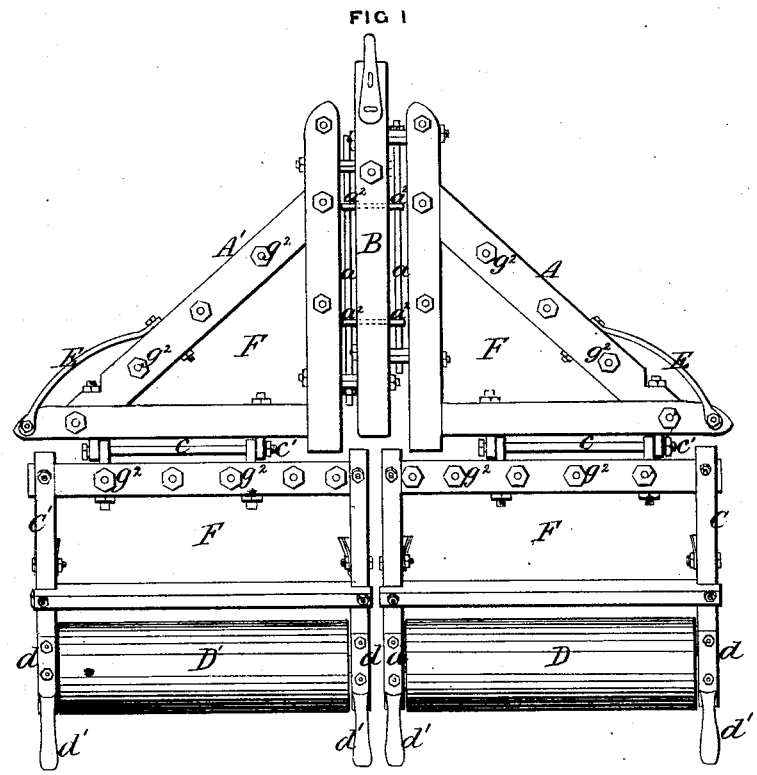
FIG I
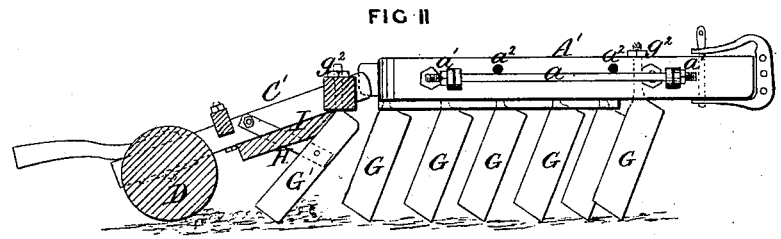
FIG II
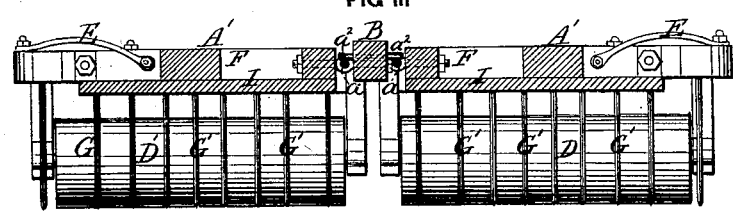
FIG III
FIG V       FIG IV
WITNESSES  
John E. Laing  
J. H. Rutherford
INVENTOR  
Henry J. Yeargin  
by Johnson and Johnson  
his Attorneys
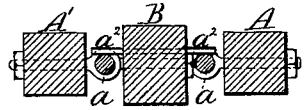
THE GRAPHIC CO. PHOTO-LITH. 39 & 41 PARK PLACE, N.Y.

UNITED STATES PATENT OFFICE.

HENRY J. YEARGIN, OF LIBERTY, TENNESSEE.

IMPROVEMENT IN COMBINED LAND-ROLLERS AND HARROWS.

Specification forming part of Letters Patent No. 163,562, dated May 18, 1875; application filed March 31, 1875.

*To all whom it may concern:*

Be it known that I, HENRY J. YEARGIN, of Liberty, in the county of De Kalb and State of Tennessee, have invented certain new and useful Improvements in Combined Land-Roller and Harrow; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to furnish a single machine or implement in which is combined a harrow and roller, and one that may be used universally by farmers upon ground of every description, and at one and the same time both harrow and roll the ground.

My invention consists in the combination and construction of devices, hereinafter more fully set forth in the claims.

In the accompanying drawings, Figure 1 represents a top view of a combined land-roller and harrow embracing my invention. Fig. 2 is a vertical section of the same. Fig. 3 is a cross-section of the tongue and its connected harrows; Fig. 4, a detached view of one of the inclined cutting-teeth, and Fig. 5 a section of the hinged tongue.

A A' are the main harrow-frames, which are of triangular form, and are hinged or pivoted upon opposite sides of a suitable tongue, B, by means of strong pintle-rods $a$ $a$, secured from endwise movement by nuts $a^1$. The tongue is provided with the usual clevis, and along its sides are inserted supporting-rods $a^2$, the outer ends of which rest upon the pintle-rods $a$, and thereby serve to brace and support the tongue, and keep it in a level position or from turning. C C' are the rear harrow-frames, of rectangular form, and are hinged or pivoted to and in rear of the lateral arms of the main frames A A' by means of strong rods $c$ $c$ and stay-nuts $c'$. The side pieces of the frames C C' project rearward, as at $d$ $d$, and serve as supports for the bearings of the rolls D D'. Upon these pieces or stringers are secured suitable handles $d'$, by grasping which the rolls may be elevated when desired. D D' are two rolls, each of which is situated between the stringers $d$ $d$, and are journaled thereto, and as they are in separate frames they are independent of each other as regards their movements. The outer corners of the main harrow-frames are braced by bars E, to strengthen the same by holding their parts and joints in a firm and rigid manner. The timbers of each of the harrow-frames form inclosures F, beneath which are secured bottom boards, thus forming receptacles for weighting the harrow in the usual manner. G G are cutting-teeth, and beneath the diagonal timbers of the frames A A', and incline from their shanks to their points rearward. G' G' are also similar cutting-teeth upon the under surface of the frames C C', and are held and inclined as the other cutters. These cutting-teeth are all, by preference, of the form shown, and are sharpened upon their forward edges to form cutting-knives. Their shanks $g$ are made integral with the blades, and it will be seen that as these blades are formed at an angle to their shanks the latter can be secured to the harrow-frame timbers in perpendicular holes by means of nuts $g^2$ upon their screw-threaded ends, and preserve the same inclination of the blade. The strain upon the blades, when in use, will therefore have little or no tendency to draw them from their sockets, but the sockets will form a long equalized bearing for the shanks. These shanks, save at their upper ends, are left flat, so that as they are drawn to place by their nuts they are embedded in the wood, and thus prevented from turning. The cutters upon the main frames are situated in the usual V position, or diagonal to the tongue, while those in the rear frames are set crosswise or transversely to the tongue, and in operation the rear follow in the spaces left by the forward cutters. In each of the rear rows of cutters those at the ends are shown as braced by bars H, one end being bolted to the blade, and the opposite end to the timbers of the frame. In practice it may be found necessary to so secure all the cutting-teeth.

I are the boards, heretofore referred to, that form the bottoms of the weight-receptacles, and also serve as rigid props or braces for the cutting-teeth, as their forward edges pass directly in the rear of the back edges of the teeth.

I propose, in some instances, to set the forward cutters at a different angle from the rear cutters, which would not be departing from the spirit of my invention.

One of the most important features of my invention is the particular relation or position that the rows of rear cutting-teeth bear to the rolls. These cutters, as heretofore set forth, project downward and to the rear, and their lower ends extend nearly to the front vertical plane of the peripheries of the rolls; hence it will be seen that any substance, such as weeds, brush, stubble, and the like, that might catch upon these teeth and interfere with their operation, will be withdrawn or removed by their trailing ends being caught under the rotating rolls, and by this means the rolls are also kept clean. As these cutters are both sharpened and inclined, and situated with their lower ends in such close proximity to the rolls, they permit this to be accomplished readily without injury to them or strain to the machine. Moreover, the inclination of the teeth directs all substances that escape them to pass beneath the roll instead of in front of it, to clog it.

The particular manner in which these harrow-frames are hinged together permits them to conform to the uneven surface of the soil as the machine is drawn upon the same to harrow it. In practice, they ride upon the ridges, and cut away and smooth off the uneven projecting portions, dragging or drawing the same into the low or sunken places. The main harrow-frames vibrate upon their side hinges along the tongue, while the latter retains a level position. The rear frames, which are independent of the tongue and of each other, turn upon their front hinges in conforming to the uneven surface, and serve also to hold and steady the main frames. Thus a longitudinal and lateral vibration of the whole machine is permitted.

It will be readily understood that in consequence of the long independent rollers, that are held firmly in the rear harrow-frames, but permitted to rise and fall, the main as well as the rear frames are kept from vibrating upon their hinges too easily, and thus from following into depressions in the ground; hence the latter is more evenly harrowed and rolled.

This apparatus not only secures all the advantages common to ordinary harrows, but additional results, which are important, and due probably to the manner of hinging and arranging the frames, and their being held from too sensitive vibration by the long rolls.

The rolls follow the cutting-teeth of the harrow, the former cutting and breaking the clods, lumps, and the like, and loosening up the soil, while the latter crushes whatever escapes, and leaves the field smooth and comparatively level. The field may be gone over one or more times, as may be desired.

I am aware that harrows have been made in sections hinged to each other, and I do not claim the same.

I claim—

1. The combination of the main harrow-frames A A', tongue B, and rear harrow-frames C C', all hinged and arranged as set forth.

2. The combination of frames A A', tongue B, frames C C', hinged as shown, the extended arms $d$, and handles $d'$, as set forth.

3. The combination, in a harrow composed of sections hinged together, of two independent rolls, D D', as and for the purpose set forth.

4. The combination of the harrow-frames A A' C C', hinged as set forth, the inclined cutting-teeth G G', and the rolls D D', as described.

In testimony that I claim the foregoing as my own I have affixed my signature in presence of two witnesses.

HENRY J. YEARGIN.

Witnesses:
WILLIAM KEITH,
ROBERT L. CLARK.